(12) United States Patent
Padgett (10) Patent No.: US 7,463,552 B1
(45) Date of Patent: Dec. 9, 2008

(54) METHOD FOR DERIVING 3D OUTPUT VOLUMES USING FILTERS DERIVED FROM FLAT SPOT DIRECTION VECTORS

(76) Inventor: Michael John Padgett, 3709 Graustark St., Houston, TX (US) 77006

( * ) Notice: Subject to any disclaimer, the term of this patent is extended or adjusted under 35 U.S.C. 154(b) by 282 days.

(21) Appl. No.: 11/481,173

(22) Filed: Jul. 5, 2006

Related U.S. Application Data

(63) Continuation-in-part of application No. 11/158,118, filed on Jun. 21, 2005, now Pat. No. 7,266,041, and a continuation-in-part of application No. 10/721,983, filed on Nov. 25, 2003, now Pat. No. 7,206,782.

(51) Int. Cl.
*G01V 1/30* (2006.01)
*G01V 1/34* (2006.01)

(52) U.S. Cl. .............................. 367/73; 367/38; 367/72
(58) Field of Classification Search .................. 367/38, 367/72, 73; 702/16
See application file for complete search history.

(56) References Cited

U.S. PATENT DOCUMENTS

| | | | |
|---|---|---|---|
| 5,001,677 A | 3/1991 | Masters | |
| 5,430,689 A | 7/1995 | Rigsby | |
| 5,583,825 A | 12/1996 | Carrazzone | |
| 5,671,136 A * | 9/1997 | Willhoit, Jr. ................. | 702/18 |
| 5,862,100 A | 1/1999 | VerWest | |
| 5,930,730 A | 7/1999 | Marfurt | |
| 6,058,074 A | 5/2000 | Swan | |
| 6,092,025 A * | 7/2000 | Neff ............................. | 702/10 |
| 6,131,071 A | 10/2000 | Partyka | |
| 6,138,076 A * | 10/2000 | Graf et al. ..................... | 702/14 |
| 6,278,949 B1 * | 8/2001 | Alam ........................... | 702/16 |
| 6,292,754 B1 | 9/2001 | Thomsen | |
| 6,317,384 B1 * | 11/2001 | Luo et al. ..................... | 367/47 |
| 6,401,042 B1 * | 6/2002 | Van Riel et al. ............... | 702/17 |
| 6,463,387 B1 | 10/2002 | Runnestrand | |
| 6,498,989 B1 | 12/2002 | Pisetski | |
| 6,674,689 B2 * | 1/2004 | Dunn et al. .................... | 367/43 |
| 6,735,526 B1 * | 5/2004 | Meldahl et al. ................ | 702/14 |
| 6,865,521 B1 * | 3/2005 | Padgett .......................... | 703/2 |
| 7,095,678 B2 * | 8/2006 | Winbow et al. ............... | 367/73 |
| 7,184,991 B1 * | 2/2007 | Wentland et al. .............. | 706/45 |

FOREIGN PATENT DOCUMENTS

WO   WO 9964896 A1 * 12/1999

* cited by examiner

*Primary Examiner*—Jack W Keith
*Assistant Examiner*—Scott A Hughes
(74) *Attorney, Agent, or Firm*—Buskop Law Group, PC; Wendy Buskop (57) ABSTRACT

A method of determining the existence of and location of hydrocarbon and water fluid contacts by analyzing spatial changes in 3D seismic data. The method begins by obtaining seismic attribute data as a 3D data volume. Then the method derives 3D dip and azimuth as a 3D volume and deriving corresponding 3D reliability volumes or derives responding 3D censor volumes which are representative of portions of the volume within which a reliable dip and azimuth can be determined. A focused subvolume of interest within the 3D data volume is then selected. The method concludes by storing filtered 3D seismic attribute data within the filter half length in each 3D direction along with null values for all non-reliability locations outside the filter half length but within the focused subvolume of interest forming a 3D output volume.

9 Claims, 9 Drawing Sheets

Seismic Attribute and computed local dip vectors data traces

↗ = Structural dip vectors computed as averages at reliability locations
○ = reliability locations

400 — Obtaining seismic attribute data as a 3D data volume.

402 — Deriving 3D dip and azimuth as a 3D volume and deriving corresponding 3D reliability volumes or deriving corresponding 3D censor volumes which are representative of portions of the volume within which a reliable dip and azimuth can be determined.

404 — Selecting a focused subvolume of interest within the 3D data volume.

406 — Determining locations within the focused subvolume of interest having a signal greater than 10% of a mean value within the 3D reliability volumes or 3D censor volumes across the focused subvolume of interest forming a sequence of reliability locations.

408 — Determining a plurality of vector dips around the reliability locations in the sequence of the reliability locations.

410 — Computing an average for the plurality of vector dips around each reliability location forming a structural dip with a structural dip azimuth, and a structural dip magnitude for each reliability location.

412 — Determining a flat spot direction vector for each structural dip, wherein the flat spot direction vector has a flat spot direction vector azimuth equaling +/-1 standard deviation from the structural dip azimuth.

414 — Computing a flat spot direction vector dip magnitude from the structural dip magnitude using (1) petrophysical data at each reliability location or (2) a user specified value of +/- 20% of the structural dip magnitude for each reliability location.

416 — Deriving and using a 3D filter with at least one filter length in each 3D direction to suppress seismic attribute data that is not in the direction of the flat spot direction vector within a filter half length in each 3D direction around each reliability location to provide filtered 3D seismic attribute data.

418 — Storing filtered 3D seismic attribute data within the filter half length in each 3D direction along with null values for all non-reliability locations outside the filter half length but within the focused subvolume of interest forming a 3D output volume.

METHOD FOR DERIVING 3D OUTPUT VOLUMES USING FILTERS DERIVED FROM FLAT SPOT DIRECTION VECTORS

CROSS REFERENCE TO RELATED APPLICATIONS

The present application is a CIP to U.S. patent application Ser. No. 10/721,983 filed on Nov. 25, 2003 now U.S. Pat. No. 7,206,782 in addition to U.S. patent application Ser. No. 11/158,118 filed on Jun. 21, 2005 now U.S. Pat. No. 7,266,041.

FIELD

The present embodiments relate generally to a method of determining and analyzing spatial changes in the earth's subsurface.

BACKGROUND

The goal of hydrocarbon exploration is to find porous and permeable geologic deposits containing high pore-space saturations of hydrocarbons, under sufficient pressure to allow some mode of commercial production. In pursuit of this goal, companies, countries and individuals collect and process many types of geophysical and geological data. The data is often analyzed to find anomalous zones that can reasonably be attributed to the presence of hydrocarbons.

The usage of 2D and 3D seismic data anomalies has been a standard practice in the petroleum industry since the 1960s. Other geologic and geophysical data anomalies have been tried, sometimes successfully, for over a century. These include various gravimetric, electromagnetic, chemical, biological and speculative methods.

The usage of anomalies for oil and gas detection has been plagued by several problems. First, most remote sensing anomalies (e.g., a 3D seismic amplitude anomaly) cannot be directly tied to a rock property that could be measured in the laboratory or using well logs. Much effort is expended attempting to tie observed anomalies to known rock responses by modeling the expected attribute response or otherwise correlating with a known producing reservoir. This work is often based on the experience of the practitioner.

A second problem is that the anomalies themselves are often evaluated or tied to response models in a qualitative manner. With qualitative assessment as the basis, quantitative, objective and reproducible error analysis has not been possible.

A third problem is that a basic physical property at work in hydrocarbon reservoirs is that both oil and gas are less dense than water. This generally causes oil and gas to accumulate up-structure in the pore-space of potential reservoir rocks. The higher water saturations are found, generally, down-structure. The exception to this is the case of heavy oil which may have a density greater than that of water. In the case of heavy oil, water may accumulate up-structure. This separation of saturations is driven by gravity. When such a separation of fluid types occurs, flat interfaces, in depth, are expected to form.

This separation causes numerous possible classes of data attribute response. First, the hydrocarbon reservoir will have one response for each hydrocarbon type. The water-saturated part of the reservoir may have a second data response and the interfacial area a third type of attribute data response.

The present invention is designed for the detection, quantification and evaluation of the depth and location of interface between lighter and heavier saturating fluids as exhibited in a data attribute dataset to locate the interface between a water reservoir and a hydrocarbon reservoir.

The lack of quantification, error analysis, subjectivity of analysis and data quality issues cause variations in the appraisal of data anomalies in oil and gas exploration and production projects. It is not uncommon for different individuals or companies to examine the same anomaly and reach irreconcilably, different conclusions. In many cases, explaining quantitatively why the anomaly of one prospect should be "believed or trusted" more than that of another prospect has not been possible. This lack of trust causes different entities to make drastically different investment decisions concerning prospects based on the same underlying data.

The present embodiments are designed for the detection, quantification and evaluation of data anomalies in the search for producible hydrocarbon deposits. The present embodiments are designed to simultaneously detect, quantify and summarize the interfacial zone between the hydrocarbon part of a proposed reservoir and the water reservoir part. The embodiments address the case of multiple hydrocarbon zones, e.g., gas over oil over water. The embodiments are designed to test the model wherein gas is less dense than oil and oil is less dense than water and the case of heavy oil being more dense than water or than gas, with data responses varying by structural position.

The current embodiments can be used for the quantification of changes in lithology, facies, or rock fabric from one location to another. The current embodiments are designed to function in areas of low signal-to-noise and aid in the determination of data suitability for hydrocarbon detection for the expected rock physics environment. The current embodiment, therefore, can be applied to the detection of subtle hydrocarbon related data anomalies.

The prior art includes isolated instances of attempts to include background analysis of seismic traces to find zones which are anomalous with respect to that background. U.S. Pat. No. 5,001,677 teaches an approach wherein multiple seismic attributes are assigned to a vector space and a background vector is constructed using, in the preferred implementation, the median of a set of attribute vectors along a seismic trace, below a given location on the earth. A distance is measured from the background vector to the data vector at a location of interest. U.S. Pat. No. 6,058,074 teaches an approach to amplitude versus offset trace processing wherein the traces are scaled by means and standard deviations of the data in background windows. Two new volumes of appropriately scaled trace intercept values and trace gradient values are then produced. U.S. Pat. No. 5,862,100 teaches the extraction of anomalous AVO points from associated background points using a statistical description of the AVO background data. This robust method is used when the background can be described by a single statistical distribution. The taught method lacks the ability to handle structured non-statistical background clusters and suffers from sampling errors on some datasets if all background windows are chosen identically.

A need exists for a method to scan large amounts of geophysical data sets systematically and simultaneously to find the presence of hydrocarbons. The method should honor non-statistical and highly structured (due to geology and rock properties) host rock geophysical responses. The method should honor small changes in the host rock layering or composition in constructing background data volumes for normalization and scanning.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present method was conceived to detect the changes in a data set associated with an interface between a water reservoir and a hydrocarbon reservoir in a given focused area for a given geologic unit. The method operates as a highly reliable low cost model, which will save expense in drilling in non-productive areas, and will reduce the amount of destruction to wilderness, as the intended Alaska drilling will incur, because of the method being able to focus only on the oil and water or natural gas adjacent to a water interface for accurate drilling, eliminating the dry hole phenomena.

In addition, the method was conceived to operate in high noise, low signal to noise environments, where the data quality is poor. A benefit for operating in high noise, low signal to noise environments, is that computation time for determining the exact spot to drill is dramatically reduced. Another benefit of being able to operate in a high noise, low signal to noise environment is avoid the need to collect additional seismic data before exploratory drilling.

The method was designed to operate on subtle hydrocarbon indicators, such as seismic amplitude in pure oil reservoirs or deep gas reservoirs, and class II and class I AVO reservoirs. By operating on subtle hydrocarbon indicators, the method enables the user to perform volume based flat spot and fluid contact detection which has not been done successfully in a volume scanning methodology. The advantage of being able to perform flat spot and fluid contact detection is that fewer dry holes and therefore less drilling will occur.

The method was also conceived to determine the errors and uncertainties in data attribute results relative to a given hydrocarbon reservoir and the corresponding water reservoir and the interfacial region.

The method addresses the case of multiple hydrocarbon zones, such as, gas over oil over water. By addressing multiple hydrocarbon zones simultaneously, this gives the user the benefit of more accurately determining possible reserves before development decisions are made and of optimally placing development wells and production facilities.

The method is designed to be used for situations where gas is less dense than oil and oil is less dense than water, and data responses vary by structural position, but transition in a very narrow range of depths or over multiple seismic times. A benefit if being able to operate for this situation is that development wells and completions can be more efficiently constructed.

The method operates will when oil is highly viscous and has a low API gravity over water and the data responses vary by structural position in a very narrow range of depths or over multiple seismic times. An advantage of the ability to operate when oil is highly viscous is that development wells and completions can be more efficiently constructed.

This method quantifies responses to changes in pore fluid saturations and by quantifying responses uncertainties in a manner that can be consistently defined, reported and replicated by others provides the advantage of being usable with rock physics analysis and other types of analysis.

Quantification and replication make the output of this method suitable for quantitative comparison with petrophysical analysis, response modeling analysis and geologic analysis, such as, fit to structure analysis and seismic modeling.

The method uses a focused sub-volume in a geological structure as a volume of investigation. The volume of investigation within the context of this patent application, applies to either a volume of a hydrocarbon reservoir, an associated water reservoir, contiguous combinations of these reservoirs or combinations of these reservoirs with other reservoirs.

The method uses an attribute file corresponding to volumetric coordinates. The volumetric coordinates can be an X-Y-Z prospect coordinate system, X-Y-Z field development system, internal 3D seismic survey coordinates, and combinations thereof.

The 3D seismic data from which the attribute data is derived must be sufficiently continuous to allow the computation of structural dip and azimuth.

The attribute file in the method can be a member of one of the following data sets:

a. a set of compiled seismic reflection data processed using a defined attribute generating algorithm;

b. a set of compiled seismic velocity data processed using a defined attribute generating algorithm;

c. a set of compiled seismic velocity data processed using a defined attribute generating algorithm;

d. a set of collected geologic measurements;

e. a set of petro-physical measurements; and f. combinations thereof.

The invention relates to a method of determining and analyzing spatial changes in the earth's subsurface. The invention also relates to a method and computer instructions on computer readable media for determining the existence of a hydrocarbon water interface and/or the existence of a hydrocarbon/hydrocarbon interface.

The invention relates to a particular focused subvolume of interest within a 3D data volume.

The embodiment of the method includes obtaining seismic attribute data as a 3D data volume.

3D dip and azimuth as a 3D volume are derived, and corresponding 3D reliability volumes or 3D censor volumes are derived which are representative of portions of the volume within which a reliable dip and azimuth can be determined.

A focused subvolume of interest within the 3D data volume is selected. Next, locations within the focused subvolume of interest are identified which have a signal greater than 10% of a mean value within the 3D reliability volumes or 3D censor volumes across the focused subvolume of interest. These identified locations with the increased signal value are then combined to form a sequence of reliability locations.

A plurality of vector dips are determined around the reliability locations in the formed sequence of reliability locations.

After the vector dips are determined, an average for the plurality of vector dips around each reliability location is computed forming a structural dip with a structural dip azimuth, and a structural dip magnitude for each reliability location.

Next a flat spot direction vector for each structural dip is determined. The flat spot direction vector has a flat spot direction vector azimuth equaling for example +/−1 standard deviation from the structural dip azimuth. The standard deviation could be +/−1 or +/−2 or +/−3 or any other number depending upon the variables of where the method is being utilized.

A flat spot direction vector dip magnitude is computed from the structural dip magnitude using (1) petrophysical data at each reliability location or (2) a user specified value that can be about +/−20% of the structural dip magnitude for each reliability location. The +/−20% value can vary depending upon the variables of where the method is being utilized. Then a 3D filter with at least one filter length in each 3D direction is used to suppress seismic attribute data that is not in the direction of the flat spot direction vector within a filter half length in each 3D direction around each reliability location to provide filtered 3D seismic attribute data.

The filtered 3D seismic attribute data is then stored within the filter half length in each 3D direction along with null values for all non-reliability locations outside the filter half length but within the focused subvolume of interest forming a 3D output volume. If previous non-null values have been stored into the 3D output volume from previously computed focused subvolumes, non-null values from the current set of filtered 3D seismic attribute data may be optionally averaged or over-write the previously computed and stored values.

The embodied methods operate on subtle hydrocarbon indicators. The embodied methods fully characterize the hydrocarbon inner and outer edges at the level of the interfacial region. The embodied methods can be used determine the errors and uncertainties in all measurements and data attribute results relative to a given hydrocarbon reservoir and the corresponding water reservoir interface.

In an alternative embodiment, the method of selecting the focus sub-volume can include an element of randomness in order to obtain a more objective analysis of the geophysical data sets. The method of selecting the focus sub-volume can further include a systematic element in order to ensure that all points of interest in a three-dimensional seismic survey volume are analyzed.

The described method utilizes a proximal approach in which each focus sub-volume is proximal to the previous. The benefit of the proximal approach is that the approach ensures that each point of interest in a three-dimensional seismic survey volume can be analyzed.

The methods can utilize a systematic approach. The systematic approach is performed by selecting subsequent focus sub-volumes that are adjacent and below and/or above the previous focus sub-volume. Once the focus sub-volumes reach the bottom of a survey volume, the systematic approach chooses a focus sub-volume adjacent and to the side of focus sub-volume in the previous "column". Subsequent focus sub-volumes and chosen below and/or above the previous focus sub-volumes until that "column' in the survey volume is analyzed. This systematic approach analyzes the data by processing data in "columns" then "rows" to ensure that each point of interest in a three-dimensional seismic survey volume is analyzed.

Figure 6:
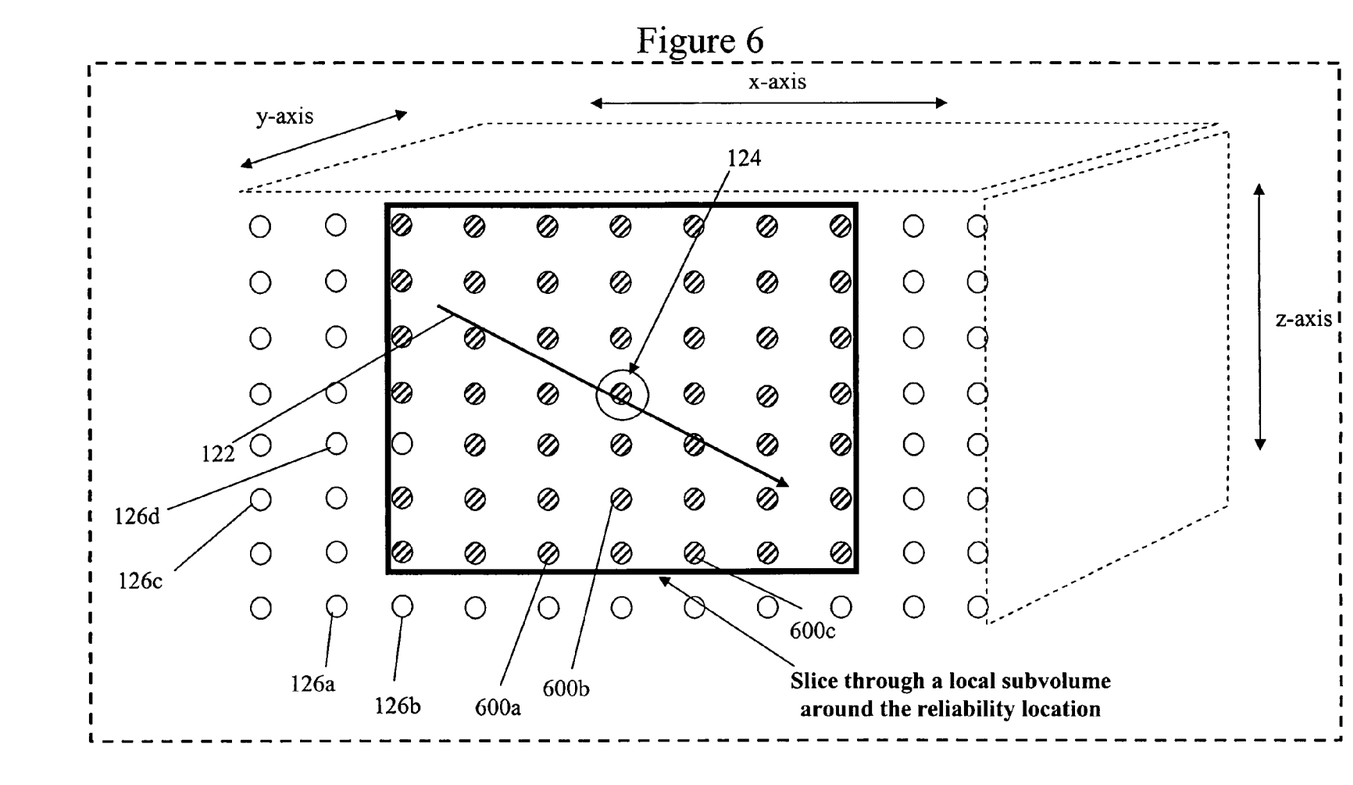
FIG. 6 shows the selection of seismic attribute grid nodes around a reliability location.

A 3D filter is derived and used to suppress seismic attribute data that is not in the direction of the flat spot direction vector within a focused subvolume, around each reliability location. For example, the flat spot directional vector might be −1 degree down, and 135 degrees east of north for a specific focused subvolume in the Gulf of Mexico. The goal is to filter the data in 3D to enhance dipping events in the direction of the flat spot dip vector, as illustrated in FIG. 6.

Typically a filter parameter, like dB/Octave, is used to specify the filter fall-off (that is the amount of suppression) in the given direction. As an example, using a filter parameter of 25 db per Octave, at 45 Hz, would be appropriate at the upper end of a Kx-Ky-F 3D filter. In this example, the filter fall out would be above 45 Hz.

Filtered seismic attributed data is stored as a filtered dataset with the output data of the focused subvolume along with null values for all non-reliability locations within the focused subvolume of interest forming a 3D output volume that covers the same portion of the earth as the focused subvolume.

In an embodiment, the steps can be applied iteratively to all 3D seismic data within the 3D geological survey for the region of exploration interest.

In another embodiment, the 3D filter suppresses data using a user selected type of filter, such as a cosine or cosine square taper filter, a trapezoidal filter, an exponential filter, a Hanning filter, a hamming filter, a Welch windowing filter or a Kx-Ky-F 3D filter described on the grid. These filters are described in "Numerical Recipes, the Art of Scientific Computing" (Fortran Version) by H.h. Press, B P Flannery et. all, Cambridge University Press, 1989 pages 381-453 incorporated herein by reference. See also, Y. Ozdogan, "Seismic Data Processing" published by the Society of Exploration Geophysicists, 1987, and J. F. Claerbout's "Imaging the earth's interior" published by Blackwell Scientific Publication, Inc., 1985.

In an alternate embodiment the 3D filter suppresses data using a user selected quantity of suppression. An example of a user selected quantity of suppression is the dB/Octave described above.

In yet another embodiment petrophysical data is inputted for each reliability location to compute expected flat spot directions from the structural dip of each reliability location. This petrophysical data should include, acoustic velocity in the hydrocarbon reservoir, and the acoustic velocity in the strata above the hydrocarbon reservoir and the acoustic velocity in the water reservoir down dip.

In one embodiment, the seismic attribute is selected from the group: seismic amplitude, variation with offset analysis, seismic inversion results, or combinations thereof. Some typical attributes that may be used as input to this method include: seismic amplitude, inverted seismic amplitude using a standard technique like constrained sparse spike, or trace integration, Hilbert transform output, like reflection strength, instantaneous frequency applied to pre-stack or post stack amplitude or derived attributes, pre-stack derived attributes like AVO gradient, AVO intercept, and algebraic manipulations of these and similar pre-stack attributes, as well as fluid factors, Lamda, rho and mu attributes, multi-attribute classification outputs, seismic velocity, stacking, imaging and instantaneous frequency. These attributes have been discussed in the article by M. Turhan Taner, in the Canadian SEG Recorder, September 2001, including the references of Taner, which is incorporated herein by reference.

In another embodiment the method includes an additional step of interpreting the 3D output volume to identify contiguous locations having a filtered output significantly different than a mean of overall 3D volume of interest across a geologic structure.

In yet another embodiment the filtered seismic attribute data has an absolute value greater than 1 standard deviation from the mean of all filtered seismic data within the area of exploration or commercial interest without being a null value.

In one embodiment the filtered seismic attribute data is for a specified time or specified depth, such as 4100 MSec at Inline=5311 and Xline=4100.

Figure 7:
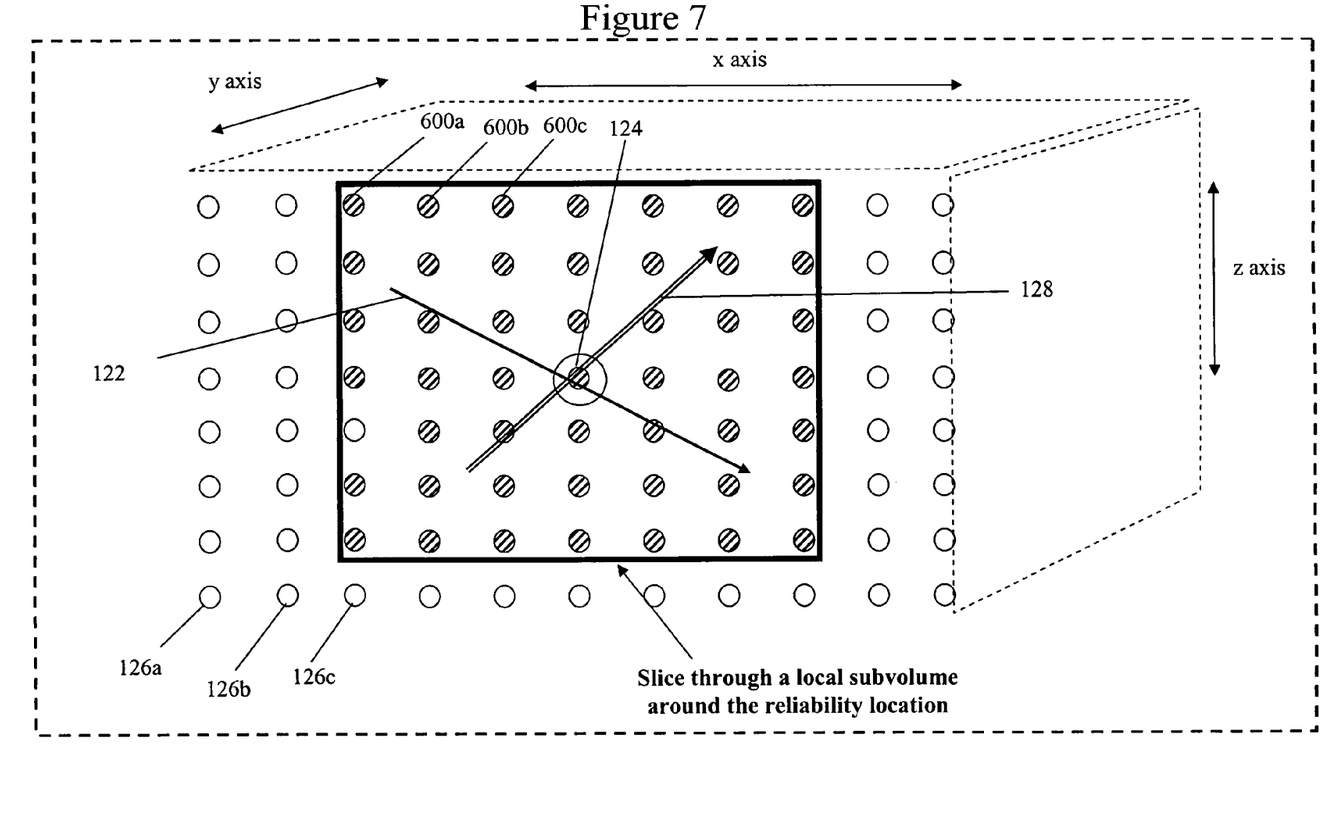
FIG. 7 shows example filter directions along which data is enhanced or degraded by the application of the derived filter.

In an alternate embodiment, the 3D output volume consists of filtered seismic attribute data and null values, as shown in FIG. 7.

In one embodiment instead of seismic attribute data, derived rock property data is used, such as well log data, derived from densely drilled reservoir and water leg system.

In yet another embodiment includes an additional step of generating a plurality of contiguous reliability locations using filtered seismic attribute data which highlight locations of water to hydrocarbons interfaces in subsurface geological structures.

Figure 1:
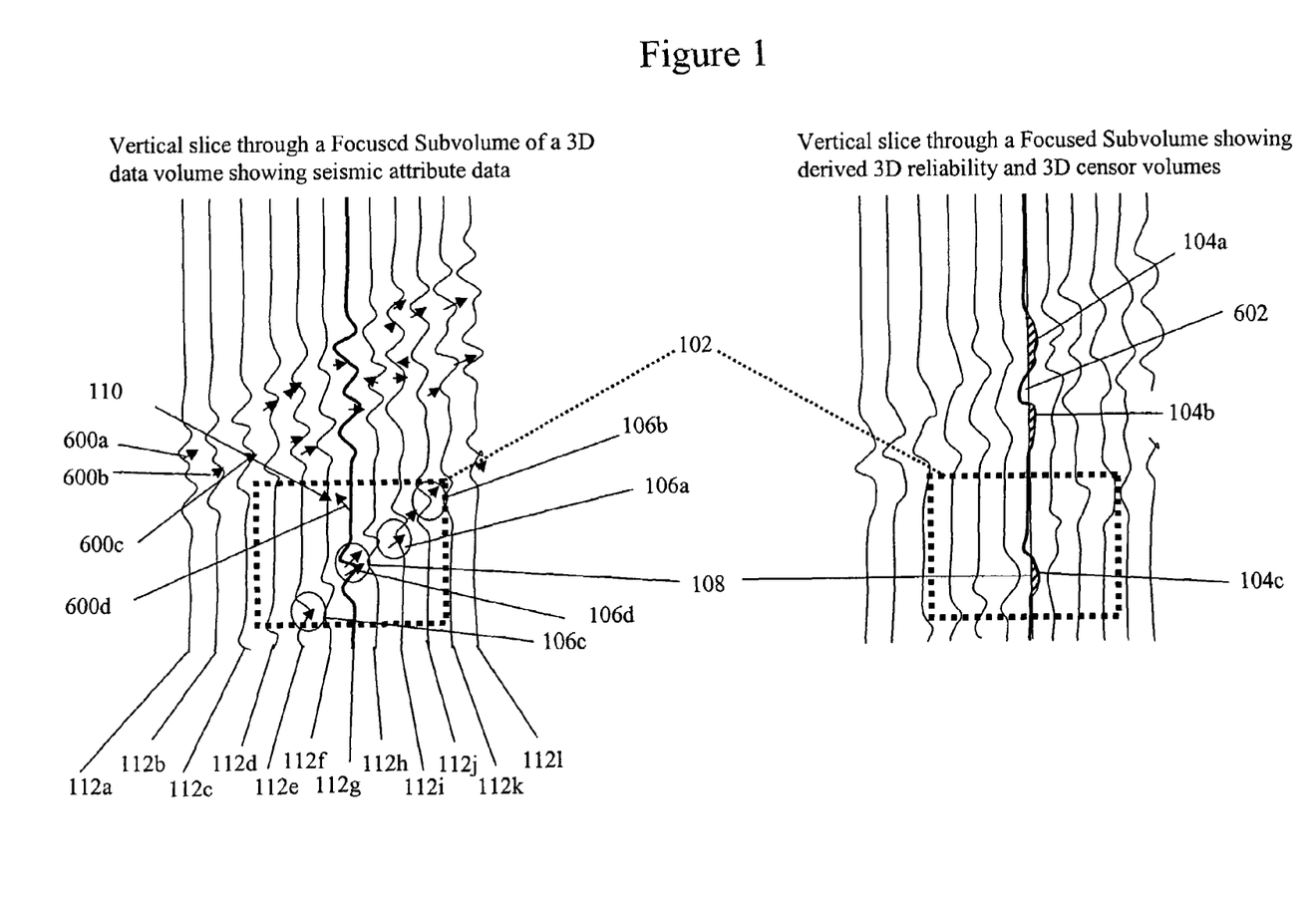
FIG. 1 is an example of derived corresponding 3D reliability volumes and 3D censor volumes for a set of 3D dip and azimuth data.

FIG. 1 depicts two traces each with multiple seismic attributes $112a$-$112l$ and computed local dip vectors data traces $600a$-$600e$, and reliability or censor data traces with a cut-off 602 with a hatched area above the cut off which identify locations where reliable dip vectors traces can be computed $104a$-$104c$. In each of these two traces there is a selected subvolume of interest 102. In the seismic attribute and computed local dip vectors data traces there is additionally a rejected local dip vector 110 not at a reliability location. The sequence of reliability locations in the circled areas are also pointed out in 106. In the reliability or censor data traces with a cut-off hatched area on a sample reliability or censor trace there are three reliability location grid location areas 104. For both traces there are local dip vectors at two reliability location 108.

A focused subvolume of interest within the 3D data volume is then selected as the focused subvolume of interest.

Locations within the focused subvolume of interest having a signal greater than for example 10% of a mean value within the 3D reliability volumes or 3D censor volumes across the focused subvolume of interest are then identified, which have a signal greater than 10% of a mean value with the 3D reliability volumes or 3D censor volumes across the focused subvolume of interest. The signal could be less than 10% of the mean value or higher than 10% of the mean value depending of variables of where the method is being utilized.

Figure 2:
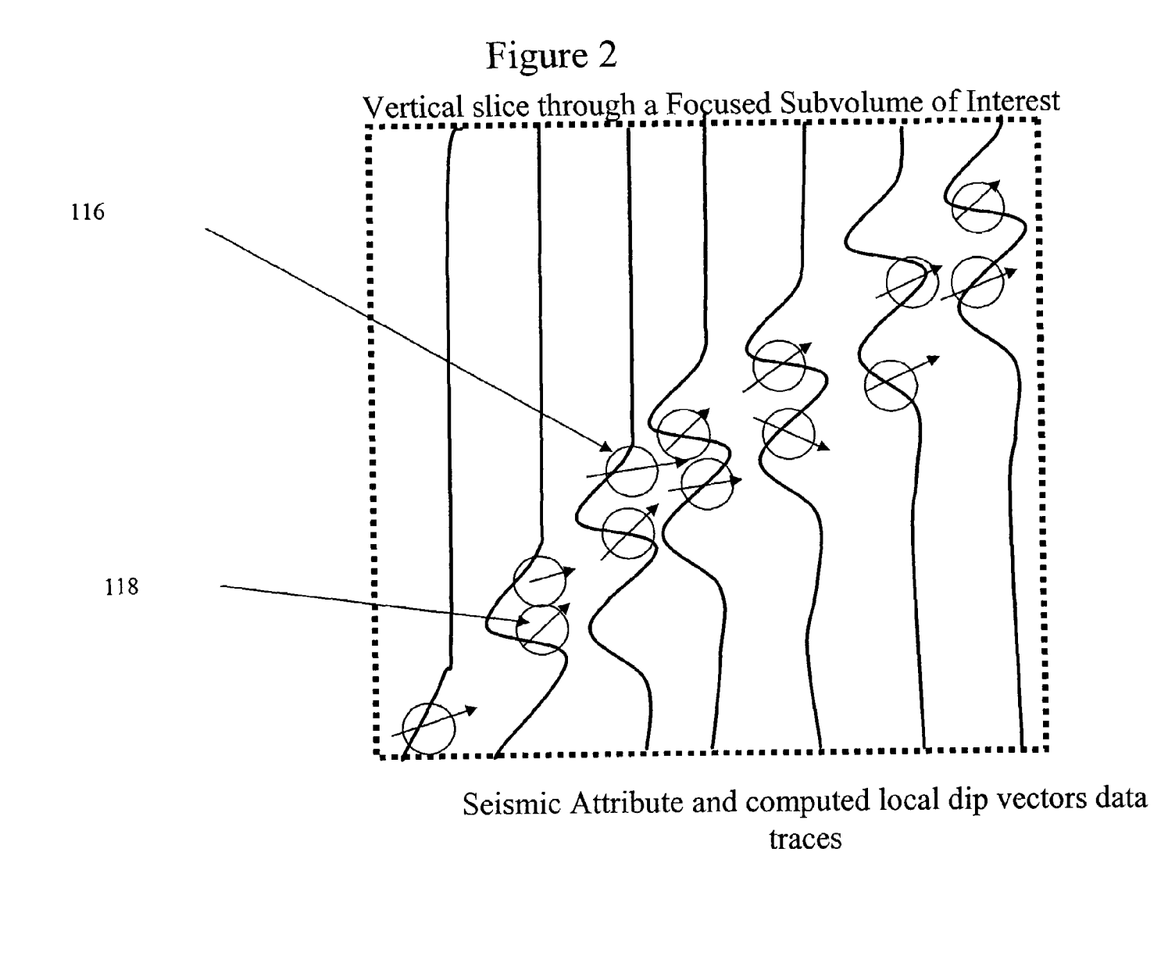
FIG. 2 depicts a group of vector dips around a sequence of reliability locations.

A plurality of vector dips around the reliability locations in the sequence of the reliability locations are identified. FIG. 2 depicts a group of local vector dips at reliability locations shown as elements 118. In addition FIG. 2 depicts the sequence of reliability locations near the circled grid node location 116. These elements 116 and 118 are shown on a vertical slice through a selected subvolume of interest of a seismic attribute and computed local dip vectors data trace.

An average for the plurality of vector dips around each reliability location is computed using a formula such as the example one shown below:

Given a sequence of reliability locations, "Seq" with internal index, r, where r=1, 2, . . . . Length(Seq), for each dip vector component Vi (i=1, 2, 3) at a reliability location at the grid location X(I,J,K), the structural dip vector components Si may be defined as:

$Si(X(I,J,K))$=Sum over r{$Vi*W(X(I,J,K),Seq(r))$}/Total_Weight where $W(X(I,J,K),Seq(r))$ is the weight function of $X(I,J,K)$ relative to $Seq(r)$ where Total_Weight=Sum over r{$W(X(I,J,K),Seq(r))$}

Figure 3:
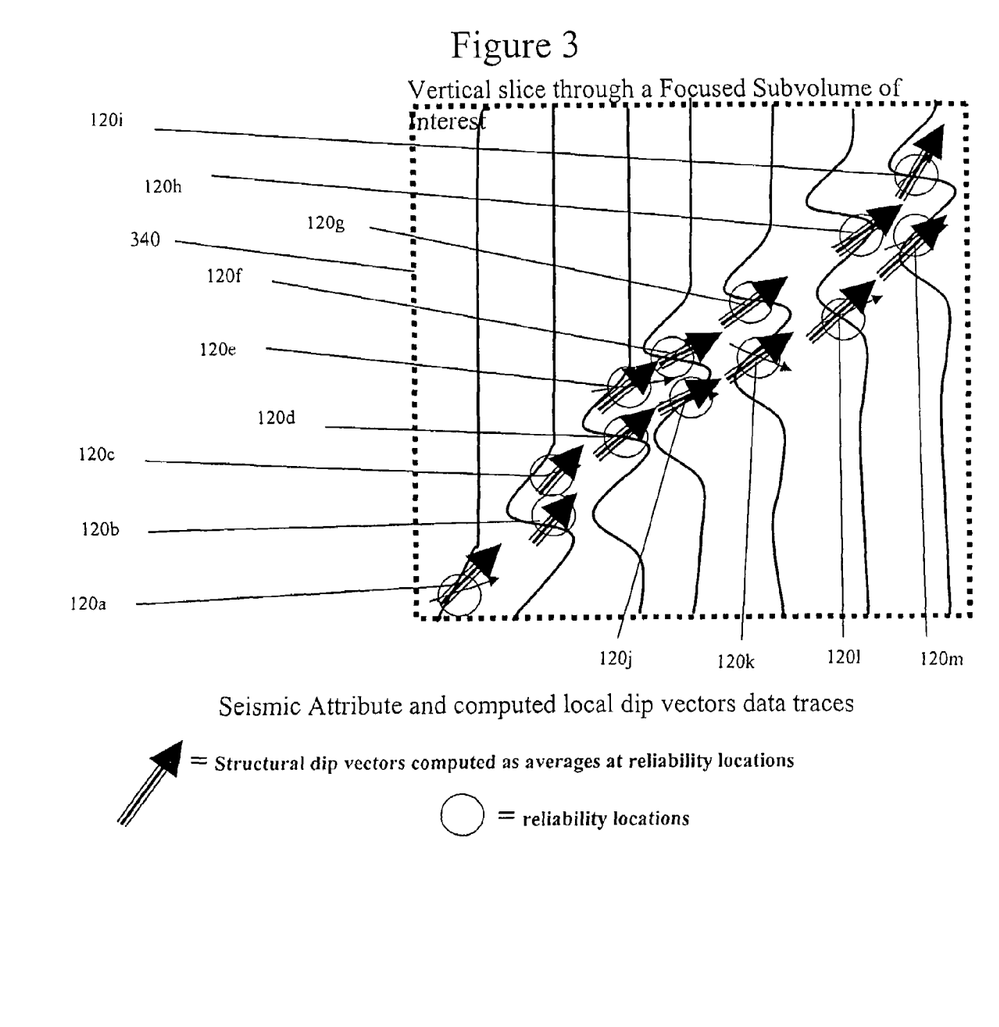
FIG. 3 shows computed structural dips for reliability locations of FIG. 2.

The average of the plurality of vector dips forms at least one structural dip for each reliability location. FIG. 3 shows structural dips $120a$-$120m$ for a reliability location. The structural dips are for the sequence of reliability locations in the circled grid node locations. Between 1 and N structural dips may be computed for any one reliability location in the sequence of the reliability locations, where N is the length of the sequence of reliability locations. In this method it is contemplated that all reliability locations have at least one structural dip vector, normally computed as an weighted average of dip vectors at nearby reliability locations as described by the equation above.

A local subvolume of interest 340 interior to the focused subvolume of interest of each reliability location wherein the local subvolume of interest 300 contains 3D dip and azimuth data as a set of vectors is next identified. The local subvolume of interest is normally chosen to include enough grid points above and below a reliability location such that a reasonable fast Fourier transform can be computed in 1, 2 and/or 3 dimensions using the seismic attribute data near the reliability location. For example, the local subvolume of interest could be chosen to be 3 samples above and 3 samples below and 3 grid nodes across in each of the x and y (or inline and crossline) directions. This selection would yield a local subvolume containing 7 by 7 by 7 grid nodes. Such a local subvolume can be filtered using a 8 sample fast Fourier transform. In the language of claim 1, the derived filter would have a half length of 4 in each coordinate direction. FIG. 6 illustrates the selection of grid nodes 126 near a reliability location 124 for the application of the filtering procedure. Larger or smaller local subvolumes, may be chosen for the specific needs of a given geologic problem.

Figure 4:
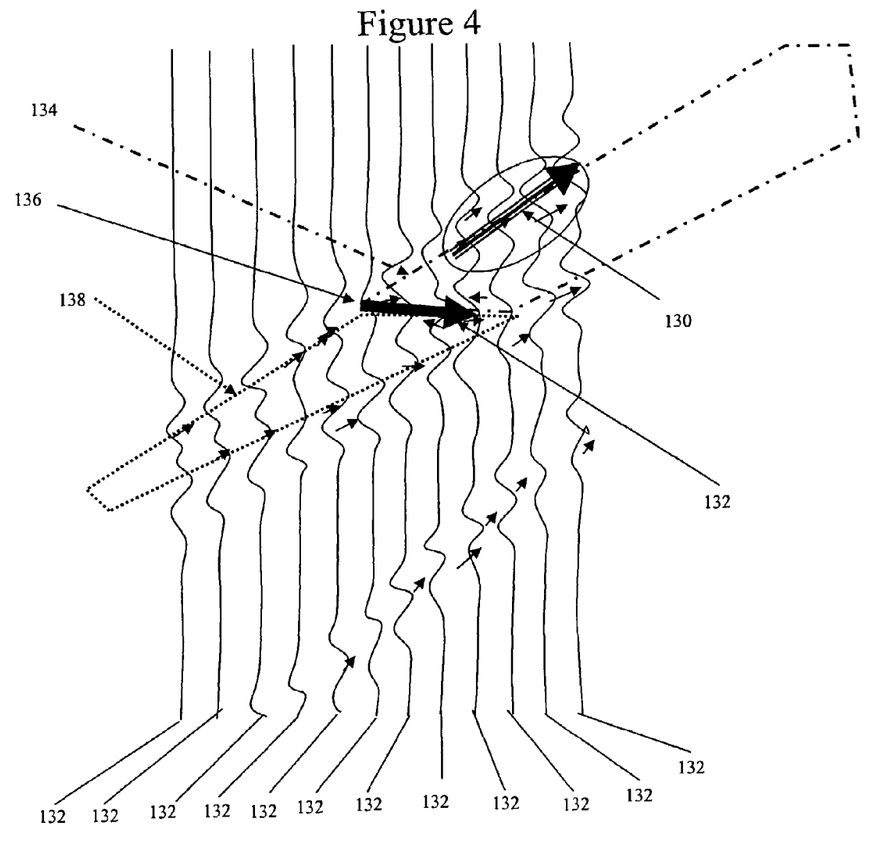
FIG. 4 shows a flat spot dip vector for an associated structural dip vector at a reliability location.

FIG. 4 depicts at least one flat spot direction vector determined for each reliability location. In FIG. 4, a flat spot direction vector 136 is computed using the structural dip vector 130. In FIG. 4, the hydrocarbon reservoir is denoted by the dotted box 134. The water reservoir is denoted by the dotted box 138. The seismic attribute flat spot event is denoted by 132. The seismic attribute data traces are denoted by $139a$-$139m$. In the case where the flat spot direction vector dip magnitude as described below is close to zero (+/−1.5 degrees of structural dip), the azimuth of the flat spot direction vector is indeterminate with the vector pointing in any direction in the X-Y plane.

The following is in an example of flat spot direction vector dip magnitude computed from the structural dip magnitude using petrophysical data: Vs=8000 ft/s, Vhc=7100 ft/s, $dTz(r)$=2.1 samples/trace then the flat spot dip vector dip magnitude in the units of samples per trace is 2.1*(7100−8000)/7100=−0.27.

In the case of depth migrated data or the lack of availability of $dTz(r)$ in the units of time samples/trace, $dTz(r)$ can be defined as 2*tan(structural dip)/Vs and where the flat spot dip vector dip magnitude can be similarly scaled into depth, if necessary for the seismic attribute dataset Z axis units in use.

Figure 5:
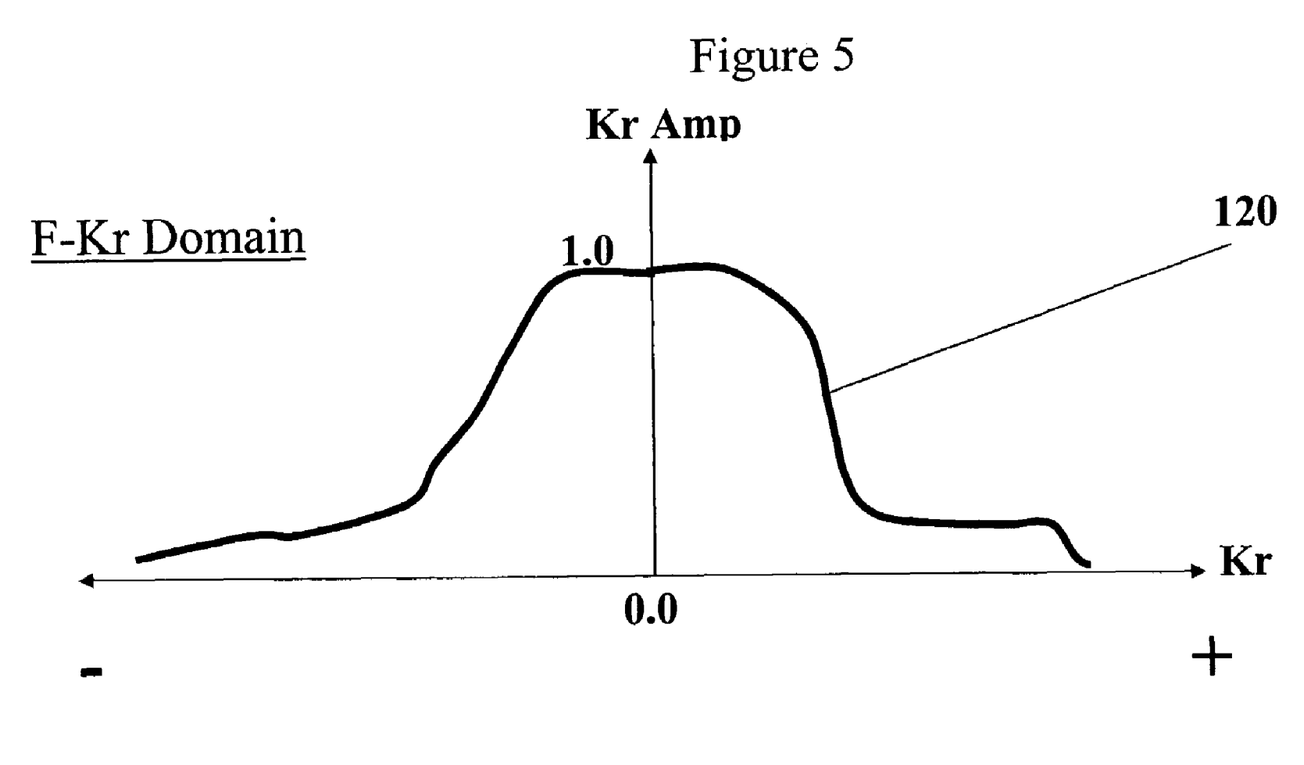
FIG. 5 shows the radial component of a 3D filter usable with a derived flat spot dip vector in the implementation of the invention.

FIG. 5 depicts a cross section of the radial component of a 3D filter usable with the derivatives of the flat spot dip vector magnitudes. In FIG. 5 the filter function could in an embodiment of the invention be derived in and/or applied in a 2D manner by performing successive 2D filter operations. In this Figure Kr Amp equals the amplitude of the 3D filter or sequence of 2D filters. Kr equals the radial K axis from the Fourier Transform(s) along the X and/or Y axes and rotated to be perpendicular to the direction of the flat spot dip vector, such that the flat spot dip vector direction is normal to KR at KR=0. dTz(r) equals the dip of the structural dip vector at the top of the hydrocarbon reservoir in units like MSec/x or Ft/x or M/x. dFC(r) equals the dip of the fluid contact or the flat spot dip vector in the time domain or Seismic Image Domain in the same units as dTz(r). The example filter function shown in FIG. 5 above could in an embodiment could be derived in and/or applied in a 2D manner by performing successive 2D filter operations. The form of the filter function could also differ in the plane(s) perpendicular to a given Frequency-KR plane. The form of the filter function above may differ in the plane(s) perpendicular to a given Frequency-KR plane. Element 120 points to a user specified filter function.

FIG. 6 depicts the selection of seismic attribute grid nodes around a reliability location. Some of the grid holes are labeled 126a-126d. Element 122 points to a flat spot direction vector. Element 124 points to reliability location. In FIG. 6, the cross filled grid locations points 600a-600c represent data locations being filtered.

FIG. 7 depicts an example of filter directions along which data is enhanced or degraded by the application of the derived filter. Element 128 demonstrates that sample direction which is not aligned with the flat spot direction vector and along which degradation would occur though filter application. Element 122 demonstrates that flat spot direction vector determines the direction along which aligned data are enhanced through filter application. Element 124 is the reliability location. In FIG. 57 cross filed grid locations represent data locations being filtered.

Figure 8:
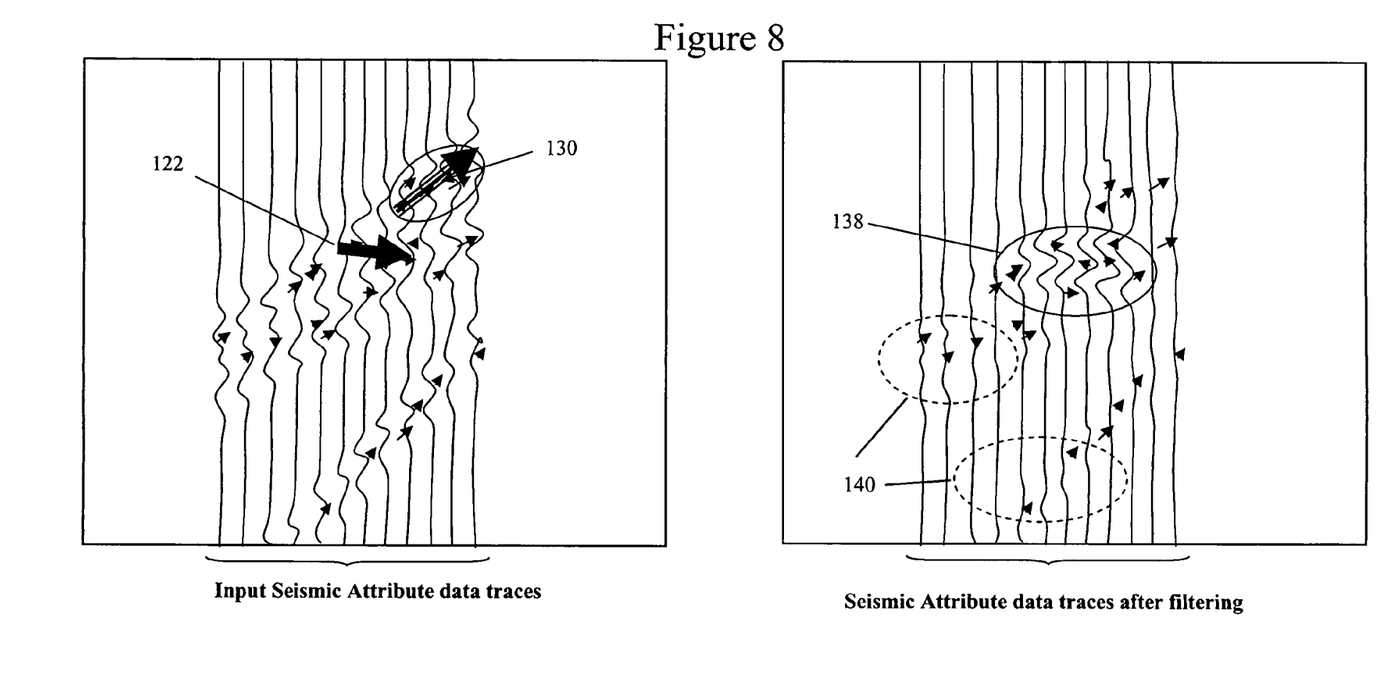
FIG. 8 shows the enhancement of sample seismic attribute traces in the direction of a flat spot direction vector and the degradation of seismic attribute data aligned in other directions.

FIG. 8 depicts before and after enhancement of sample seismic attribute traces in the direction of a flat spot direction vector and the degradation of seismic attribute data aligned in other directions. Events away from the fluid contact are removed or degraded (dashed circled areas), relative to the flat spot seismic event (solid circled region). Element 122 is a flat spot direction vector on input seismic attribute data traces. Element 130 is structural dip vector. Element 138 indicates the actual fluid contact which is simultaneous with the flat spot event in both the input seismic attribute data traces and the seismic attribute data traces after filtering. Element 140 points to regions in the filtered data which show seismic data as having been removed, degraded or suppressed by the filtering operation.

As illustrated in FIG. 7, the grid nodes around the reliability location are filtered to enhance data alignment in the direction of the flat spot direction vector and to degrade data that might be aligned in some other direction. The enhancement in the data aligned in the direction of the flat spot direction vector relative to data aligned in other directions is illustrated in FIG. 7.

Figure 9:
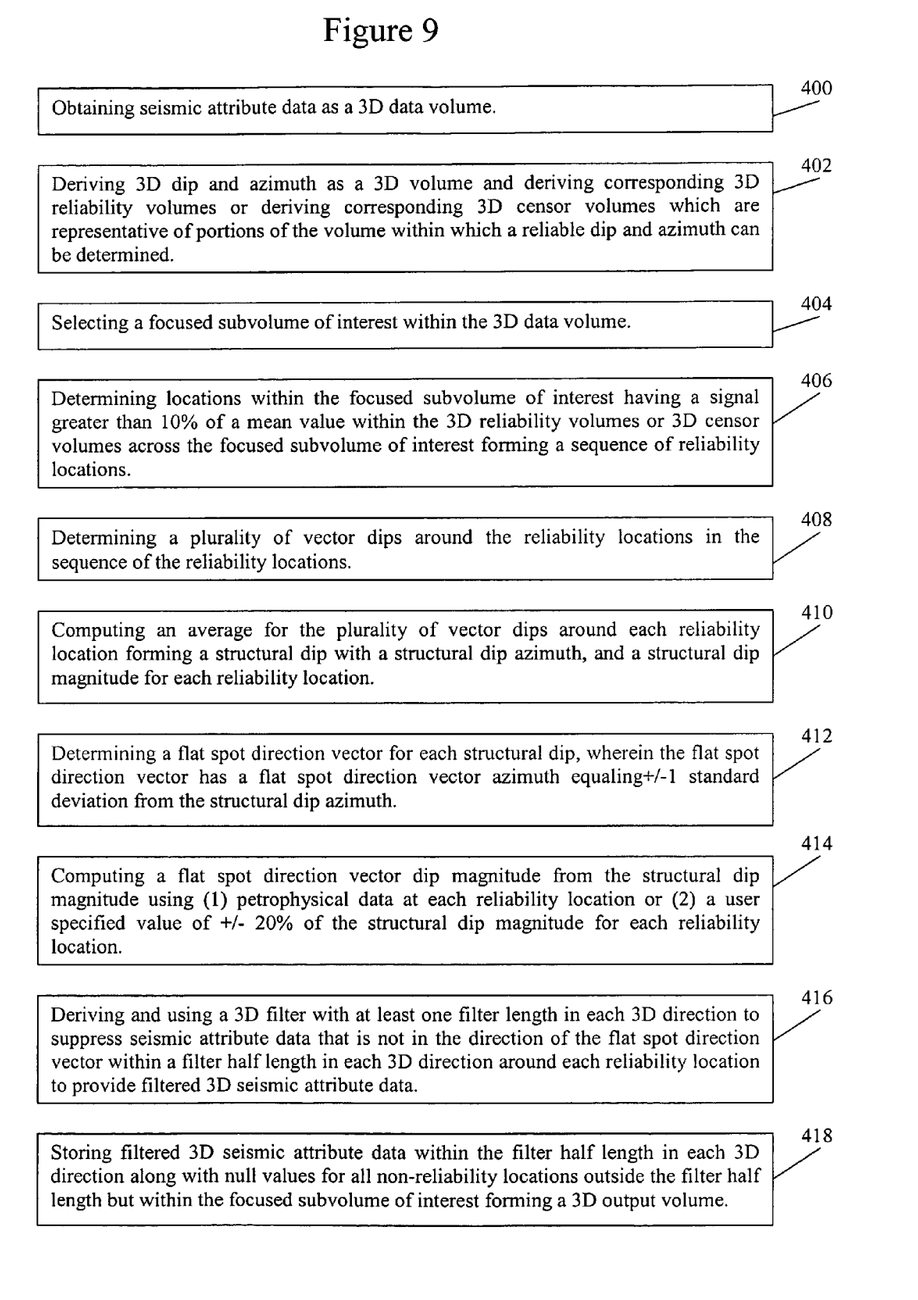
FIG. 9 shows a flow chart of the method.

FIG. 9 depicts a flowchart of the method. Element 400 obtains seismic attribute data as a 3D data volume. Element 402 derives 3D dip and azimuth as a 3D volume and deriving corresponding 3D reliability volumes or deriving corresponding 3D censor volumes which are representative of portions of the volume within which a reliable dip and azimuth can be determined. Element 404 selects a focused subvolume of interest within the 3D data volume. Element 406 determines locations within the focused subvolume of interest having a signal greater than 10% of a mean value within the 3D reliability volumes or 3D censor volumes across the focused subvolume of interest forming a sequence of reliability locations. Element 408 determines a plurality of vector dips around the reliability locations in the sequence of the reliability locations. Element 410 computes an average for the plurality of vector dips around each reliability location forming a structural dip with a structural dip azimuth, and a structural dip magnitude for each reliability location. Element 412 determines a flat spot direction vector for each structural dip, wherein the flat spot direction vector has a flat spot direction vector azimuth equaling +/−1 standard deviation from the structural dip azimuth. Element 414 computes a flat spot direction vector dip magnitude from the structural dip magnitude using (1) petrophysical data at each reliability location or (2) a user specified value of +/−20% of the structural dip magnitude for each reliability location. Element 416 derives and uses a 3D filter with at least one filter length in each 3D direction to suppress seismic attribute data that is not in the direction of the flat spot direction vector within a filter half length in each 3D direction around each reliability location to provide filtered 3D seismic attribute data. Element 418 stores filtered 3D seismic attribute data within the filter half length in each 3D direction along with null values for all non-reliability locations outside the filter half length but within the focused subvolume of interest forming a 3D output volume.

In discussing this method, several terms require consistent definition. The water reservoir is a geologic rock formation having both porosity and permeability and saturated primarily by water. The water formation may contain a partial hydrocarbon saturation, but at a sufficiently low level so as to preclude economic development.

Similarly, the hydrocarbon reservoir is a geologic rock formation having both porosity and permeability and saturated in most cases by a combination of water and hydrocarbons. The saturation of hydrocarbons must be sufficiently high so as to allow economic development. If the saturation of hydrocarbons does not allow the production of hydrocarbons and associated water in quantities that are commercial, the reservoir would not be called a hydrocarbon reservoir. Typically, the hydrocarbon reservoir is found up-structure of the water reservoir, which is located down-structure. In this discussion, up-structure refers to shallower depths from the surface within the earth. Down-structure refers to deeper depths within the earth. In the case of seismic travel times, deeper depths correspond to larger absolute value seismic travel times and shallower depths to smaller absolute value travel times.

Both depths and seismic travel times are typically measured from a specified datum. The datum is a specified surface to which measurements are referenced. For example, in offshore exploration and production, the datum is typically taken to be mean sea level. Depths or seismic times are then referenced to mean sea level as the datum.

The seismic data volumes used in the analysis can be generated from any defined attribute generating algorithm. Examples of data that can be analyzed in seismic volume format include seismic velocity data processed using a defined attribute generating algorithm, a set of geophysical gravity data extract, compiled or collected for a 3D volume, or a set of petro-physical measurements, such as resistively, for a 3D volume of interest.

The 3D seismic volume file can be a set of compiled seismic reflection data, processed using a defined attribute generating algorithm and extracted for, in relation to or in conjunction with a sub-volume of interest or a set of compiled seismic velocity data processed using a defined attribute generating algorithm and extracted for or in conjunction with a sub-volume of interest. This data can be processed to extract internal structures within the data, as in amplitude variation with recording offset or NMO velocity. Such specialized extractions stored in a 3D volume format can be suitable as input to these embodied methods.

In one embodiment the method of determining the existence of and location of hydrocarbon and water fluid contacts can be done by analyzing spatial changes in 3D seismic data. The method can obtain seismic attribute data as a 3D data volume. The method can additionally obtain 3D dip and azimuth data as at least one set of 3D volume data and deriving corresponding 3D reliability volumes or deriving corresponding 3D censor volumes which are representative of portions of the at least one set of 3D volume data which 3D dip data and azimuth data can be reliably determined. The method also selects a focused subvolume of interest within the at least one set of 3D volume data. The method can also determine reliability locations within the focused subvolume of interest having non-null 3D dip data and non-null 3D azimuth data within the 3D reliability volumes or 3D censor volumes across the focused subvolume of interest forming a sequence of reliability locations. The method is also able to compute an average for a plurality of vector dips around each reliability location in the sequence of the reliability location forming at least one structural dip vector for each reliability location. The method can additionally determine a flat spot direction vector for each structural dip vector at each reliability location. It is possible for the method to derive and use a 3D filter with at least one filter length in each direction of the 3D data volume to suppress seismic attribute data that is not parallel to the determined flat spot direction vector around each reliability location to provide filtered 3D seismic attribute data. The method can also store the filtered 3D seismic attribute data forming a 3D output subvolume. It is possible for the method to repeat the method for all 3D volume data forming a 3D output volume.

One embodiment can involve imputing petrophysical data for each reliability location to compute expected flat spot directions from the structural dip of each reliability location.

In an alternate embodiment the 3D filter suppresses seismic attribute data using a user selected style of filter.

In yet another embodiment the 3D filter suppresses seismic attribute data using a user selected quantity of suppression.

In one embodiment can include inputting petrophysicial data for each reliability location to compute expected flat spot directions from the structural dip of each reliability location.

In yet another embodiment the seismic attribute is selected from the group: seismic amplitude, inverted seismic amplitude; Hilbert transform output, prestack derived attributes, fluid factor, lamda, rho and mu attributes, multi-attribute classification outputs, seismic velocity or combinations thereof.

In an alternate embodiment the step of interpreting the 3D output volume to identify contiguous locations across a geologic structure having a filtered seismic attribute data that is significantly above a mean of the filtered seismic attribute data for the 3D output volume.

In one embodiment the filtered seismic attribute data is for a specified range of times or specified range of depth.

In one embodiment instead of seismic attribute data, derived rock property data is used.

It is possible that an embodiment include comprising the step of generating a plurality of contiguous reliability locations using filtered seismic attribute data which highlight locations of water to hydrocarbons interfaces in subsurface geological structures.

In one embodiment computer instructions on a computer readable media, comprise instructions to cause a processor to determine the existence of and location of hydrocarbon and water fluid contacts by analyzing spatial changes in 3D seismic data.

The method can obtain seismic attribute data as a 3D data volume. The method can additionally obtain 3D dip and azimuth data as at least one set of 3D volume data and deriving corresponding 3D reliability volumes or deriving corresponding 3D censor volumes which are representative of portions of the at least one set of 3D volume data which 3D dip data and azimuth data can be reliably determined. The method also selects a focused subvolume of interest within the at least one set of 3D volume data. The method can also determine reliability locations within the focused subvolume of interest having non-null 3D dip data and non-null 3D azimuth data within the 3D reliability volumes or 3D censor volumes across the focused subvolume of interest forming a sequence of reliability locations. The method is also able to compute an average for a plurality of vector dips around each reliability location in the sequence of the reliability location forming at least one structural dip vector for each reliability location. The method can additionally determine a flat spot direction vector for each structural dip vector at each reliability location. It is possible for the method to derive and use a 3D filter with at least one filter length in each direction of the 3D data volume to suppress seismic attribute data that is not parallel to the determined flat spot direction vector around each reliability location to provide filtered 3D seismic attribute data. The method can also store the filtered 3D seismic attribute data forming a 3D output subvolume. It is possible for the method to repeat the method for all 3D volume data forming a 3D output volume.

While this method has been described with emphasis on the preferred embodiments, it should be understood that within the scope of the appended claims, the method might be practiced other than as specifically described herein.

What is claimed is:

1. A method of determining the existence of and location of hydrocarbon and water fluid contacts by analyzing spatial changes in 3D seismic data comprising the steps of:
 a) obtaining seismic attribute data as a 3D data volume;
 b) obtaining 3D dip and azimuth data as at least one set of 3D volume data and deriving corresponding 3D reliability volumes or deriving corresponding 3D censor volumes, which are representative of portions of the at least one set of 3D volume data from which 3D dip data and azimuth data can be reliably determined;
 c) selecting a focused subvolume of interest within the at least one set of 3D volume data;
 d) determining reliability locations within the focused subvolume of interest having non-null 3D dip data and non-null 3D azimuth data within the 3D reliability volumes or 3D censor volumes across the focused subvolume of interest forming a sequence of reliability locations;
 e) computing an average for a plurality of vector dips around each reliability location in the sequence of the reliability locations forming at least one structural dip vector for each reliability location;
 f) determining a flat spot direction vector for each structural dip vector at each reliability location;
 g) deriving and using a 3D filter with at least one filter length in each direction of the 3D data volume to suppress seismic attribute data that is not parallel to the determined flat spot direction vector around each reliability location to provide filtered 3D seismic attribute data;

h) storing the filtered 3D seismic attribute data forming a 3D output subvolume; and i) repeating the method for all 3D volume data forming a 3D output volume.

2. The method of claim 1, further comprising inputting petrophysical data for each reliability location to compute expected flat spot directions from the structural dip of each reliability location.

3. The method of claim 1, wherein the 3D filter suppresses seismic attribute data using a user selected style of filter.

4. The method of claim 1, wherein the 3D filter suppresses seismic attribute data using a user selected quantity of suppression.

5. The method of claim 1, wherein the seismic attribute is selected from the group: seismic amplitude, inverted seismic amplitude; Hilbert transform output, prestack derived attributes, fluid factor, lambda, rho and mu attributes, multi-attribute classification outputs, seismic velocity or combinations thereof.

6. The method of claim 1, further comprising the step of interpreting the 3D output volume to identify contiguous locations across a geologic structure having a filtered seismic attribute data that is significantly above a mean of the filtered seismic attribute data for the 3D output volume.

7. The method of claim 1, wherein the filtered seismic attribute data is for a specified range of times or specified range of depth.

8. The method of claim 1, further comprising the step of generating a plurality of contiguous reliability locations using filtered seismic attribute data which highlight locations of water to hydrocarbons interfaces in subsurface geological structures.

9. Computer instructions on a computer readable media, comprising instructions to cause a processor to determine the existence of and location of hydrocarbon and water fluid contacts by analyzing spatial changes in 3D seismic data comprising the steps of:

a) obtaining seismic attribute data as a 3D data volume;

b) obtain 3D dip and azimuth data as at least one set of 3D volume data and deriving corresponding 3D reliability volumes or deriving corresponding 3D censor volumes which are representative of portions of the at least one set of 3D volume data which 3D dip data and azimuth data can be reliably determined;

c) selecting a focused subvolume of interest within the at least one set of 3D volume data;

d) determining reliability locations within the focused subvolume of interest having non-null 3D dip data and non-null 3D azimuth data within the 3D reliability volumes or 3D censor volumes across the focused subvolume of interest forming a sequence of reliability locations;

e) computing an average for a plurality of vector dips around each reliability location in the sequence of the reliability location forming at least one structural dip vector for each reliability location;

f) determining a flat spot direction vector for each structural dip vector at each reliability location;

g) deriving and using a 3D filter with at least one filter length in each direction of the 3D data volume to suppress seismic attribute data that is not parallel to the determined flat spot direction vector around each reliability location to provide filtered 3D seismic attribute data;

h) storing the filtered 3D seismic attribute data forming a 3D output subvolume; and repeating the method for all 3D volume data forming a 3D output volume.

* * * * *